US007690486B2

(12) United States Patent
Rhodes et al.

(10) Patent No.: US 7,690,486 B2
(45) Date of Patent: Apr. 6, 2010

(54) DRIVE MECHANISM FOR A VEHICLE CLOSURE

(75) Inventors: Chris Rhodes, Orléans (FR); Paul Bizard, Sully sur Loire (FR)

(73) Assignee: ArvinMeritor Light Vehicle Systems - France, Sully-sur-Loire (FR)

( * ) Notice: Subject to any disclaimer, the term of this patent is extended or adjusted under 35 U.S.C. 154(b) by 7 days.

(21) Appl. No.: 12/099,331

(22) Filed: Apr. 8, 2008

(65) Prior Publication Data

US 2008/0202885 A1 Aug. 28, 2008

Related U.S. Application Data

(62) Division of application No. 11/190,485, filed on Jul. 27, 2005, now Pat. No. 7,360,635.

(30) Foreign Application Priority Data

Jul. 30, 2004 (FR) .................................. 04 08461

(51) Int. Cl.
*E05F 15/10* (2006.01)
*F16D 67/06* (2006.01)
*H02K 7/10* (2006.01)

(52) U.S. Cl. ....................... 192/18 B; 192/84.9; 310/76

(58) Field of Classification Search ................. 192/130, 192/144
See application file for complete search history.

(56) References Cited

U.S. PATENT DOCUMENTS

| | | | | |
|---|---|---|---|---|
| 4,121,382 | A * | 10/1978 | Dietrich et al. | 49/334 |
| 4,640,050 | A * | 2/1987 | Yamagishi et al. | 49/280 |
| 6,125,583 | A * | 10/2000 | Murray et al. | 49/291 |
| 6,199,322 | B1 | 3/2001 | Itami et al. | |
| 6,425,206 | B1 * | 7/2002 | Noda et al. | 49/360 |
| 6,548,974 | B2 | 4/2003 | da Silva Filgueiras | |
| 2004/0046401 | A1 | 3/2004 | Watanabe | |

FOREIGN PATENT DOCUMENTS

| | | |
|---|---|---|
| DE | 2615511 | 10/1997 |
| JP | 9-137673 | 5/1997 |

OTHER PUBLICATIONS

European Search Report dated Nov. 24, 2005.

* cited by examiner

*Primary Examiner*—Richard M. Lorence
(74) *Attorney, Agent, or Firm*—Carlson, Gaskey & Olds

(57) ABSTRACT

A drive mechanism includes an electric motor, a rotor driven by the electric motor, and a worm screw driven by the rotor. The drive mechanism further includes a wheel driven by the worm screw, the wheel transmitting movement of the electric motor to a vehicle closure, and a clutch on the rotor connecting the worm screw to the electric motor or disconnecting the worm screw from the electric motor.

19 Claims, 2 Drawing Sheets

DRIVE MECHANISM FOR A VEHICLE CLOSURE

REFERENCE TO RELATED APPLICATION

This application is a divisional of U.S. application Ser. No. 11/190,485 filed Jul. 27, 2005, now U.S. Pat. No. 7,360,635 which claims priority to French Patent Application FR 04 08 461 filed Jul. 30, 2004.

BACKGROUND OF THE INVENTION

The present invention relates generally to an anti-pinch system.

Mechanisms for driving a closure, in particular for a vehicle, can be fitted with anti-pinch systems. These systems allow, for example, the direction of rotation of the drive motor to reverse when pinching is detected.

The drawback of these systems is that the inertia of the drive motor prevents instantaneous reversal of the window in the event of pinching. This can lead to an increase in pinching which exceeds the limits prescribed (for example, by Standard FMVSS 118) during the time required to reverse the direction of rotation of the motor, which prevents drive mechanisms from obtaining standard approval.

Document DE-A-26 15 511 describes a drive mechanism, in particular for a window regulator, including a clutch arranged between a reduction gear of a gear motor and a pinion for driving the window by an arm and sector mechanism. The clutch partially disengages the drive mechanism when an obstruction prevents the rise of the window, creating a resisting effort which opposes the torque of the gear motor. The clutch includes a spring designed to engage/disengage the mechanism at a set resisting torque threshold value. This device is simply a torque limiter. The mechanism maintains the pinching at the threshold value defined above. A need therefore exists for an anti-pinch system that is more effective and complies with existing standards.

SUMMARY OF THE INVENTION

The present invention provides an anti-pinch system of a vehicle closure including a detection system for detecting pinching and a clutch to disconnect the vehicle closure from a vehicle closure driving mechanism following detection of pinching by the detection system.

The invention also relates to a vehicle closure driving mechanism including the anti-pinch system as described previously and a transmission including an input and an output connected to the vehicle closure, the input and the output being connected by the clutch.

According to one embodiment, the vehicle closure driving mechanism also includes an electric motor for driving the input and a reduction gear driven by the output, the clutch being between the motor and the reduction gear. According to one embodiment, the clutch is of the electromagnetic type. According to one embodiment, the vehicle closure driving mechanism also includes a brake acting either on the input or the output when the clutch is in a disengaged state. According to one embodiment, the drive mechanism is a window regulator, a sun roof mechanism, a drive mechanism of a swing or sliding door, a tailgate or a boot flap mechanism.

The invention also relates to an anti-pinch method in a vehicle closure drive mechanism including the steps of detecting pinching and then controlling disengagement from the vehicle closure drive mechanism.

According to one embodiment, the mechanism includes a closure drive motor, and the method also includes the steps of reversing the rotation of the motor and then re-engaging the vehicle closure drive mechanism. According to one embodiment, the method is performed by the above-described vehicle closure drive mechanism.

BRIEF DESCRIPTION OF THE DRAWINGS

Other characteristics and advantages of the invention will become apparent when reading the following detailed description of embodiments of the invention, given by way of example only and with reference to FIGS. 1 and 2 which show a schematic representation of a drive mechanism.

DETAILED DESCRIPTION OF THE PREFERRED EMBODIMENT

This invention relates to an anti-pinch system for a vehicle closure. In particular, the anti-pinch system includes a clutch which is able to disconnect the vehicle closure from a closure drive mechanism after a detection system detects pinching. The detection system, with or without contact, are known to a person skilled in the art and are not the subject of this invention. Thus, disengaging the vehicle closure drive mechanism prevents an increase in the pinching force during the time required, for example, to reverse the movement of the vehicle closure drive mechanism in order to clear the obstruction.

Figure 1:
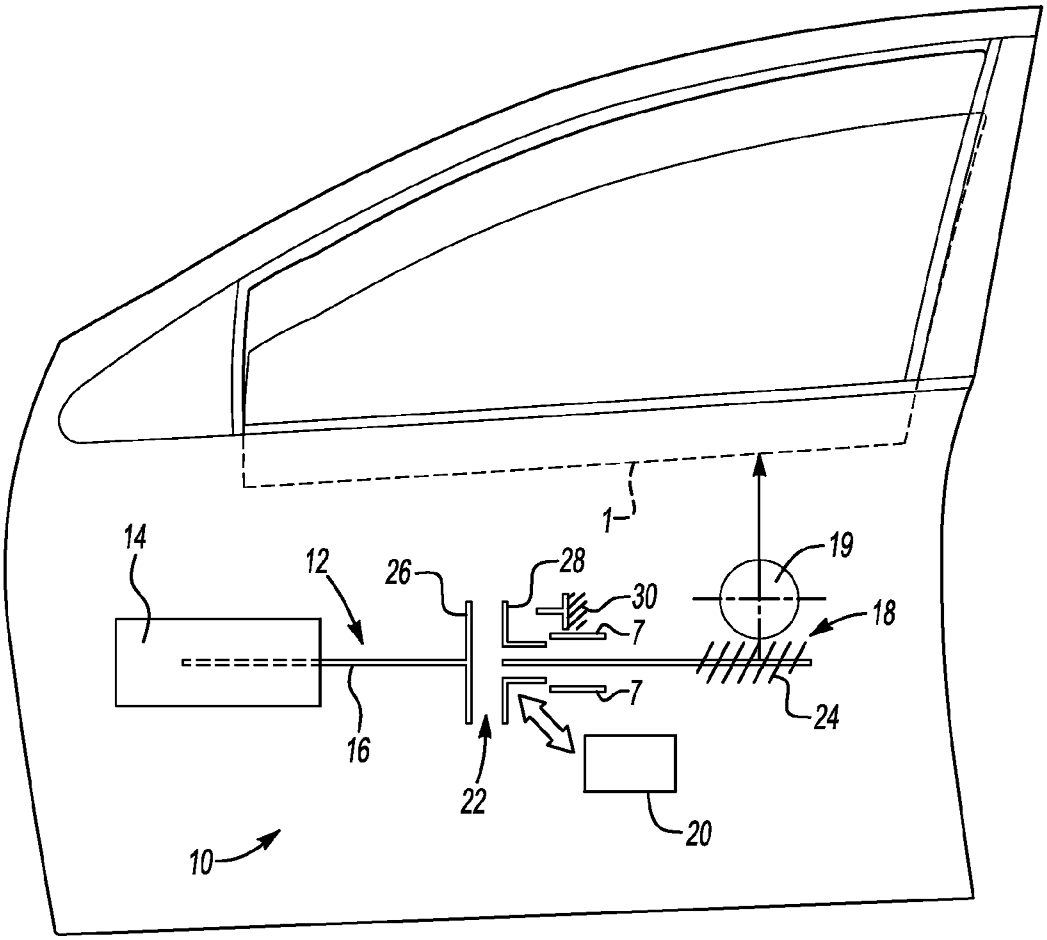

FIG. 1 shows a schematic representation of a drive mechanism 10. There follows a description of the invention in a mechanism such as a window regulator. Of course, the window regulator is given as an example and the invention could apply to other types of closure drive mechanisms, such as a sunroof, a sliding or swing door, a tailgate or a boot flap.

FIG. 1 shows a transmission 12 corresponding to a gear motor. The transmission 12 includes an input 16 and an output 18. The drive mechanism 10 also includes an electric motor 14 driving the input 16. The input 16 is connected to a rotor of the motor 14. In FIG. 1, the input 16 is a part of the rotor. The output 18 can be a reduction gear including a wheel 19 and a worm screw 24. In the case of a window regulator, the reduction gear is connected to a cable winding drum or a pinion driving a sector gear for a sector arm mechanism. The input 16 drives the output 18 by the clutch 22, and the clutch 22 is preferably between the motor 14 and the worm screw 24 on the rotor according to FIG. 1. This arrangement has the advantage of requiring a smaller clutch 22 because the torque on the rotor is less than the torque applied downstream of the reduction gear (for example, between the reduction gear and the output pinion or between the reduction gear and the winding drum where the clutch 22 must be larger to allow for the reduction ratio). Placed on the rotor, the size of the clutch 22 is based, for example, on the size of the diameter of the armature. The clutch 22 is, for example, composed of two plates 26 and 28 which remain in contact when the clutch 22 is in the engaged state, transmitting the torque by friction. The plates 26 and 28 are, for example, on the rotor between the motor 14 and the worm screw 24. By way of example, it is possible that the plate 26 is integral with the part of the rotor connected to the input 16 of the transmission 12, and the plate 28 is mobile in translation relative to the other part of the rotor connected to the output 18. In the engaged state, the plate 28 engages the plate 26, allowing the entire mechanism to be driven. In the disengaged state, the plate 28 moves away from the plate 26 along the rotor, and the output 18 of the transmission then no longer engages the input 16. The anti-pinch system also includes a pinching detection system 20.

The clutch 22 and the detection system form the anti-pinch system of the drive mechanism 10. When the detection system detects pinching, the clutch 22 is changed from an engaged state to a disengaged state. Thus, if an object, such as a finger, is pinched between the window 1 and the window frame, the drive mechanism 10 is disengaged, preventing the continued driving of the closure in the direction of closure. The clutch 22 allows the drive motor to be disconnected from the remainder of the closure's kinematic train. It is possible that the drive mechanism 10 is then reversed to free the pinched object. The clutch 22 is designed to re-engage the drive mechanism 10 and to allow the window 1 to be driven downwards. The clutch 22 is preferably not re-engaged until after the direction of rotation of the motor 14 is reversed.

By way of example, the clutch 22 is electromagnetic. This allows the drive mechanism 10 to be disengaged quickly and minimizes the pinching. The drive mechanism 10 can be disengaged by the clutch 22 in less than 5 ms for example, which in a typical existing system would allow the pinching force to be reduced from 30 to 40 N. The limit according to the above-mentioned Standard FMVSS is 100 N maximum. Moreover, the clutch 22 offers the possibility of gaining about another 5 ms at a low cost by replacing the control relay with a power transistor. This would require four power transistors to obtain the equivalent saving in motor switching, which is clearly less economical. According to the choice of design, the clutch 22 is either engaged or disengaged in the absence of current. The second case is preferable from the point of view of security because the window cannot move if the clutch 22 fails. In the context of FIG. 1, the clutch 22 can include a coil 7 around the part of the rotor connected to the output 18, which allows the plate 28 to move and disengage.

Figure 2:
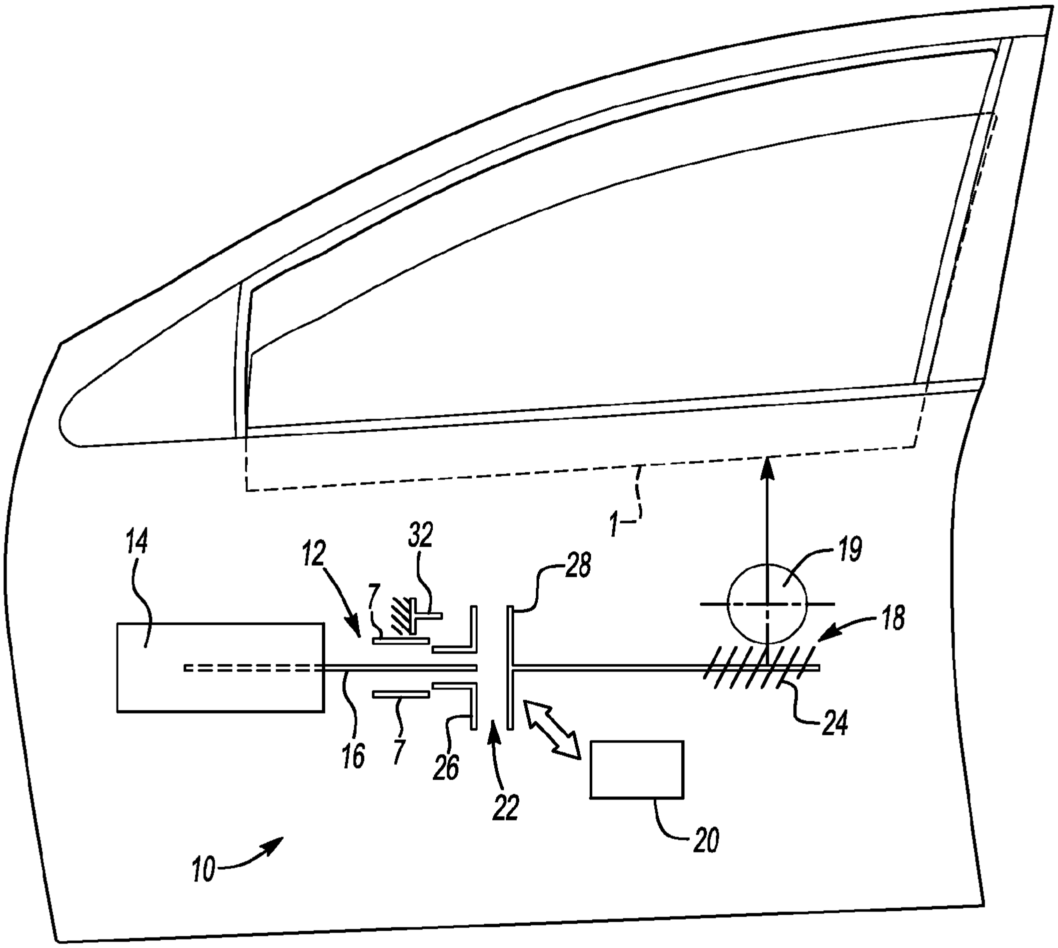

The clutch 22 in the disengaged state can be used as a brake. Depending on the choice of design, this allows either faster stopping of the rotor when pinching is detected, particularly to counter the motor's inertia, and thus quicker reversal of the motor to free the trapped object or action on the part of the transmission connected to the output 18 and thus to the closure, which can advantageously replace other means for making the movement of the closure irreversible and which can prevent the risk of intrusion into the vehicle. The brake consists, for example, of an immobile element 30, which the plate 28 lies flat against when the clutch 22 is open. Alternatively, according to the reverse configuration represented by FIG. 2, the plate 28 is integral with the output 18. The plate 26, thus mobile in translation on the drive shaft, lies flat against the fixed element 32 when the clutch 22 is open. This therefore brakes the motor's kinetic energy.

The invention also relates to an anti-pinch method. This method can be performed in a vehicle-closure drive mechanism. For example, this may be a window regulator as described previously, a drive mechanism of a sunroof, a sliding or swing door, a tailgate or a boot flap. The method includes a first pinching-detection step. Detection can occur by measuring the variation in the feed current or the speed of the motor or other method such as detection without contact. The method then includes the step of controlling disengagement from the drive mechanism. Disengagement control is activated by detecting pinching. The method allows rapid disconnection of the drive motor from the rest of the closure's kinematic chain. The method can then include additional steps of reversing the direction of rotation of the motor and re-engaging the drive mechanism once the motor's direction of rotation has been reversed.

The foregoing description is only exemplary of the principles of the invention. Many modifications and variations are possible in light of the above teachings. It is, therefore, to be understood that within the scope of the appended claims, the invention may be practiced otherwise than using the example embodiments which have been specifically described. For that reason the following claims should be studied to determine the true scope and content of this invention.

The invention claimed is:

1. A drive mechanism comprising:

an electric motor;

a rotor driven by the electric motor;

a worm screw driven by the rotor;

a wheel driven by the worm screw, the wheel transmitting movement of the electric motor to a vehicle closure; and a clutch on the rotor connecting the worm screw to the electric motor or disconnecting the worm screw from the electric motor.

2. The drive mechanism according to claim 1, wherein the rotor includes a part that is connected to the worm screw and another part that is connected to the electric motor, and the clutch is composed of two plates that transmit torque by friction.

3. The drive mechanism according to claim 2, wherein the two plates are on the rotor, one of the plates being connected to the pail of the rotor that is connected to the worm screw, the other plates being connected to the another part of the rotor that is connected to the electric motor.

4. The drive mechanism according to claim 2, wherein one of the two plates is integral with the part of the rotor that is connected to the electric motor.

5. The drive mechanism according to claim 2, wherein one of the two plates is a mobile plate that is mobile with respect to the another part of the rotor that is connected to the worm screw.

6. The drive mechanism according to claim 5, further including an electromagnetic coil around the part of the rotor connected to the worm screw, the electromagnetic coil allowing the mobile plate to move and disengage.

7. The drive mechanism according to claim 5, further including a brake, the mobile plate being braked by the brake when the clutch is in a disengaged state.

8. The drive mechanism according to claim 2, wherein one of the two plates is integral with the another part of the rotor connected to the worm screw.

9. The drive mechanism according to claim 2, wherein one of the two plates is a mobile plate that is mobile with respect to the part of the rotor connected to the electric motor.

10. The drive mechanism according to claim 9, further comprising a brake, the mobile plate being braked by the brake when the clutch is in a disengaged state.

11. The drive mechanism according to claim 1, wherein the clutch is an electromagnetic clutch.

12. The drive mechanism according to claim 1, wherein the clutch is in an engaged state in the absence of current.

13. The drive mechanism according to claim 1, wherein the clutch is in a disengaged state in the absence of current.

14. A drive mechanism comprising:

an electric motor;

a rotor driven by the electric motor;

a worm screw driven by the rotor;

a wheel driven by the worm screw, the wheel transmitting movement of the electric motor to a vehicle closure; and a clutch on the rotor between the worm screw and the electric motor.

15. The drive mechanism according to claim 14, wherein the rotor includes a part that is connected to the worm screw and another part that is connected to the electric motor, the clutch is composed of two plates that transmit torque by friction, one of the two plates being connected to the part of the rotor that is connected to the worm screw and the other of the two plates being connected to the another part of the rotor that is connected to the electric motor.

16. The drive mechanism according to claim 15, wherein one of the two plates is a mobile plate and the other of the two plates is integral with one of the parts of the rotor.

17. The drive mechanism according to claim 16, further comprising a brake, the mobile plate being braked by the brake when the clutch is in a disengaged state.

18. The drive mechanism according to claim 14, wherein the clutch is an electromagnetic clutch and is in a disengaged state in the absence of current.

19. The drive mechanism according to claim 14, wherein the clutch is an electromagnetic clutch and is in an engaged state in the absence of current.

* * * * *